A. L. JONES.
CAMERA.
APPLICATION FILED JULY 16, 1915.
1,312,122.
Patented Aug. 5, 1919.
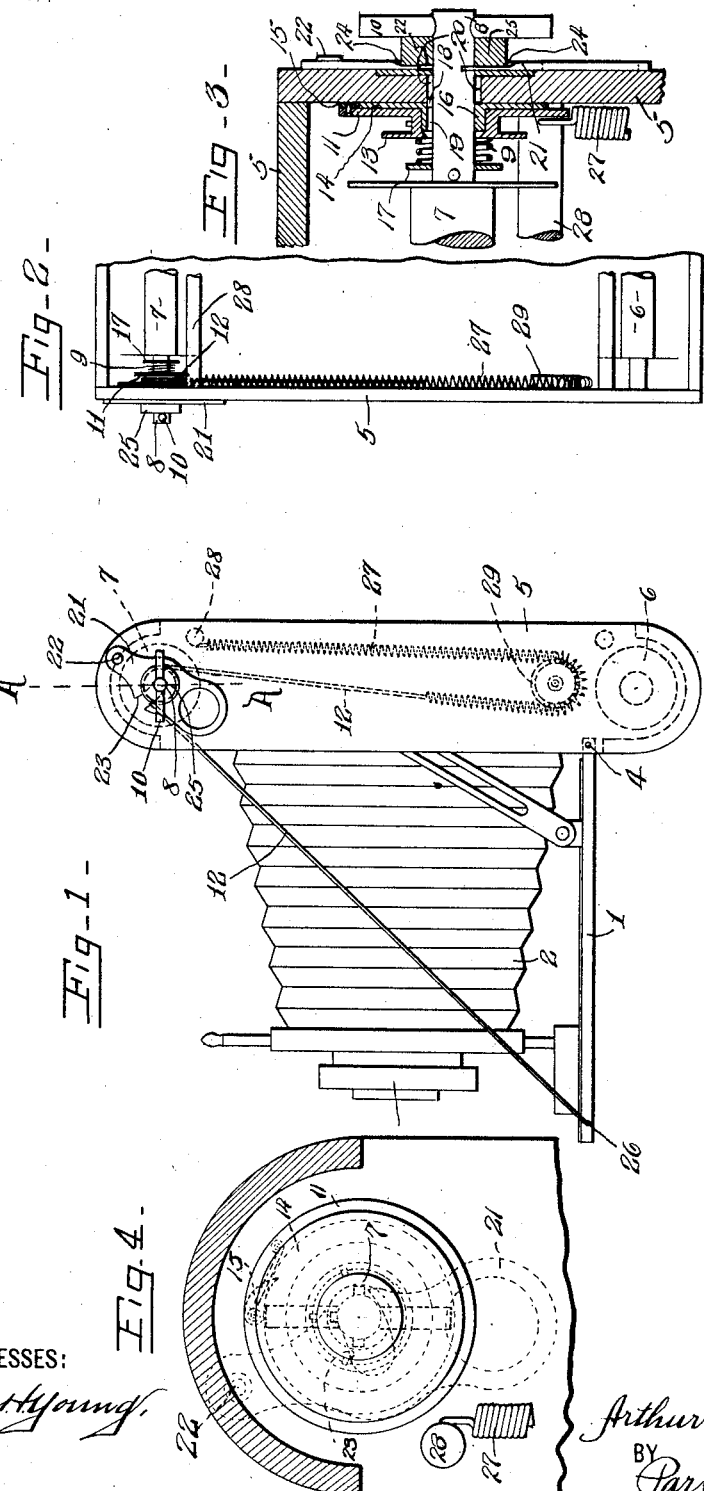
WITNESSES:
Chas H Young
INVENTOR
Arthur L. Jones.
BY
Parsons + Badell
ATTORNEYS

UNITED STATES PATENT OFFICE.

ARTHUR L. JONES, OF AUBURN, NEW YORK.

CAMERA.

1,312,122.   Specification of Letters Patent.   Patented Aug. 5, 1919.

Application filed July 16, 1915. Serial No. 40,230.

*To all whom it may concern:*

Be it known that I, ARTHUR L. JONES, a citizen of the United States, and a resident of Auburn, in the county of Cayuga and State of New York, have invented a certain new and useful Camera, of which the following is a specification.

This invention relates to cameras and has for its object a particularly simple and efficient means for guarding against a double exposure of the same part of the film or other sensitized sheet, which means is particularly simple in construction and highly efficient in use, and the invention consists in the novel features hereinafter set forth and claimed.

In describing this invention reference is had to the accompanying drawings, in which like characters designate corresponding parts in all the views.

Figure 1 is a side elevation of a camera provided with my invention.

Fig. 2 is a fragmentary view showing in rear elevation a portion of the camera with the back plate removed.

Fig. 3 is an enlarged sectional view, partly in elevation and parts being removed, on line A—A, Fig. 1.

Fig. 4 is a sectional view looking to the right in Fig. 3 parts being removed.

This camera comprises, generally, a part shiftable automatically each time the camera is adjusted or positioned to take a picture, means for feeding the film, and power transmitting means between said part and the film feeding means whereby the film feeding means is actuated in a forward direction during each operation of said movable part.

The movable part is preferably a member which is opened and closed during the folding and unfolding of the camera, and as here shown it is the leaf 1 which supports the bellows 2 and lens and shutter casing 3 of the camera, the leaf being hinged at 4 to the body or box 5 of the camera and being movable on its hinge during the opening and closing of the camera, and forming the front wall of the box 5 when the camera is closed.

In this embodiment of my invention, the sensitized sheet is a film which is arranged on one spool 6 located in the box 5 at one end thereof, and a winding spool 7 upon which the film winds, located in the opposite end of the box. The film feeding means includes the spool 7, means for turning said spool 7, and power transmitting means including a flexible connection betwen the leaf 1 and the means for winding the spool.

The means for turning the spool includes the usual axle 8 provided with the usual clutching means at its inner end for engaging the spool 7 at one end, this axle being shiftable axially against the action of the spring 9 out of engagement with the spool 7 to permit the removal and replacing of the spool 7. The axle is provided with the usual cross bar or handle 10 at its outer end by means of which the axle may be turned and also shifted axially by hand.

The power transmitting connections between the leaf 1 and the spool 7, in addition to the axle, include a wheel or pulley 11, loosely mounted on the axle over which a flexible connection as a cord or belt 12 runs and means for connecting and disconnecting said pulley or wheel 11 and the axle 8. The pulley 11 is here shown as formed with a groove 13 in which the belt or cord 12 runs and this belt is connected to the axle 8 through the medium of a ratchet wheel 14 mounted on the axle 8 adjacent the pulley 11 and by a pawl 15 carried by said pulley or wheel carrier 11.

The ratchet wheel 14 is mounted directly upon the axle 8 and the pawl carrying wheel is mounted upon the hub 16 of the ratchet wheel, and the spring 9, previously referred to, is interposed between the pulley or pawl carrier 11 and a shoulder or abutment 17 on the axle.

The means by which the pulley 11 is clutched to the axle 8 so that its motion in a forward direction is transferred to the axle 8, includes a suitable shiftable clutch member normally in position to clutch the ratchet wheel 14 to the axle 8 and being shiftable out of said position. As here shown, this clutch member is a key 18 projecting from the axle 8 into a groove or keyway 19 in the hub of the ratchet wheel 14, the clutch 18 being shiftable with the axle 8 when it is moved axially, into an annular recess 20 in the wall of the box 5, and when in said recess 20 and out of the way 19, the ratchet wheel 14 and pawl carrier 11 are disconnected from the axle 8. The shifting of the axle 8 to move the clutch 18 out of engagement with the ratchet wheel 14 is not sufficient to disengage the axle from the spool 7.

The means for shifting the axle 8 axially to shift the clutch 18 sufficiently only to disconnect or unclutch the clutch 18 and ratchet wheel 14, as here shown, consists of a cam 21 located on the outside of the box 5 and pivoted at 22 thereto and having a slot 23 for receiving the axle 8, and inclines or cam surfaces 24 which engage a suitable hub or washer 25 on the axle 8.

When the member 21 is moved into the position shown in Fig. 1, the surfaces 24 engage the hub 25 and shift the axle 8 outwardly.

The flexible connection or belt 12 consists of a cord secured at one end at 26 to the free end of the leaf 1, and running over the pulley 11 and connected to one end of a spring 27. The spring 27 is secured at one end at 28 to the box within the same and at its other end to the cord 12, and the intermediate part of the spring passes around a suitable pulley 29 on the interior of the box. When the cam 21 is swung out of its operative position shown in Fig. 1, and when the leaf 1 is swung open to position the camera, or the bellows and parts carried thereby, in position to take a picture, the pawl carrier 11 will be turned as the leaf is swung open, and the motion thereof transferred to the axle 8 and hence to the spool 7, through the pawl 15 and ratchet wheel 14.

When the leaf 1 is folded and the camera closed, the spring 27 will take up the slack in the cord 12 which during its retrograde movement rotates the pawl carrier 11 in a retrograde direction, the pawl 15 ratcheting on the wheel 14 during this operation. If it is desired to wind the spool by hand, the cam 21 is swung into the position shown in Fig. 1, thus shifting the axle 8 outwardly far enough to move the clutch 18 out of engagement with the ratchet wheel 14 so that the ratchet wheel 14 and pawl carrier 11 are free of the axle 8.

As before stated, the axial shifting of the axle 8 by the cam 21 is not sufficient to disengage its inner end from the spool 7 and hence the spool 7 can be wound manually by turning the axle 8 with the handle 10. For removing the spool 7, the axle 8 is pulled outwardly out of the engagement with said spool until the inner end of the axle is free of the spool 7.

Folding cameras, in their ordinary use, are used to take pictures occasionally, are folded up between the times they are used and are seldom used for successive exposures without being folded up. When used successively the user is usually on guard and does not neglect to turn a new film into position to be exposed.

Hence this device is particularly advantageous for preventing a double exposure of the same film in the ordinary use of folding cameras.

What I claim is:—

1. In a folding camera, the combination of a folding member, means for feeding the film including a winding spool, an axle connected to the spool, a ratchet wheel mounted on the axle, a wheel loosely mounted concentric with the axle, a pawl supported by the wheel and coacting with the ratchet wheel, a flexible connection secured to the folding member and passing over the pawl carrying wheel, and clutch for connecting the ratchet wheel and the axle and being shiftable out of connection with one of the parts it connects, and means for shifting the clutch, substantially as and for the purpose set forth.

2. In a folding camera, the combination of a folding member, and means for feeding the film including a winding spool, an axle connected to the spool, a ratchet wheel mounted on the axle, a wheel loosely mounted concentric with the axle, a pawl supported by the latter wheel and coacting with the ratchet wheel, a flexible part secured to the folding member and passing over the pawl carrying wheel, and a spring connected to the flexible part to resist movement thereof by the folding part of the camera, substantially as and for the purpose described.

3. In a folding camera, the combination of a folding member, and means for feeding the film including a winding spool, an axle connected to the spool, a ratchet wheel mounted on the axle, a wheel loosely mounted concentric with the axle, a pawl supported by the wheel and coacting with the ratchet wheel, a flexible part secured to the folding member and passing over the pawl carrying wheel, a clutch for connecting the ratchet wheel and the axle and being shiftable out of connection with one of the parts it connects, means for shifting the clutch, and a spring connected to the flexible part to resist movement thereof by the folding member of the camera, substantially as and for the purpose specified.

4. In a camera, the combination of means for feeding a film including a winding spool, an axle connected to the spool and movable axially, a spring for resisting axial movement of the axle out of engagement with the spool, a wheel loosely mounted concentric with the axle, a ratchet wheel mounted on the axle adjacent the former wheel, means connecting the wheels whereby the second wheel is driven by the first wheel in a forward direction and is free of the first when the first wheel rotates in a retrograde direction, a clutch carried by the axle and movable therewith and being normally arranged to connect the axle and the second wheel, means for moving the axle axially sufficiently to move the clutch out of engagement with the second wheel without moving said axle out of engagement with the spool, and means coacting with the first wheel to rotate the same, substantially as and for the purpose set forth.

5. In a camera, the combination of means for feeding a film including a winding spool, an axle connected to the spool and movable axially, a spring for resisting axial movement of the axle out of engagement with the spool, a pawl carrier mounted on the axle, a ratchet wheel mounted on the axle adjacent the pawl carrier, a pawl supported by the carrier and coacting with the ratchet wheel, a clutch carried by the axle and movable therewith and being normally arranged to connect the axle and the ratchet wheel, means for moving the axle axially sufficiently to move the clutch out of engagement with the ratchet wheel without moving said axle out of engagement with the spool, a part operable during each opening and closing movement of the camera, and a belt connected at one end to said part and running over the pawl carrier to rotate the same, substantially as and for the purpose described.

6. In a camera, the combination of means for feeding a film including a winding spool, an axle connected to the spool and movable axially, a spring for resisting axial movement of the axle out of engagement with the spool, a pawl carrier mounted on the axle, a ratchet wheel mounted on the axle adjacent the pawl carrier, a pawl supported by the carrier and coacting with the ratchet wheel, a clutch carried by the axle and movable therewith and being normally arranged to connect the axle and the ratchet wheel, means for moving the axle sufficiently to move the clutch out of engagement with the ratchet wheel without moving said axle out of engagement with the spool, a part operable during each opening and closing movement of the camera, a belt connected at one end to said part and passing over the pawl carrier, and a spring connected to the other end of the belt, substantially as and for the purpose specified.

In testimony whereof, I have hereunto signed my name at Auburn, in the county of Cayuga, and State of New York, this 8th day of July, 1915.

ARTHUR L. JONES.

Copies of this patent may be obtained for five cents each, by addressing the "Commissioner of Patents, Washington, D. C."